Nov. 23, 1948.  H. S. LEO ET AL  2,454,465

PIPE FITTING

Filed Sept. 16, 1946

INVENTORS.
HERBERT S. LEO
BEN B. BRESLOW
BY THEIR ATTORNEYS.
HARRIS, KIECH, FOSTER & HARRIS
BY Clarence F. Kiech Patented Nov. 23, 1948

2,454,465

UNITED STATES PATENT OFFICE 2,454,465

PIPE FITTING

Herbert S. Leo and Ben B. Breslow, Los Angeles, Calif., assignors to Utility Appliance Corp., Los Angeles, Calif., a corporation of California Application September 16, 1946, Serial No. 697,188

5 Claims. (Cl. 285—30)

Our invention relates generally to connector fittings and particularly to pipe fittings for use in connection with tanks, vats, or various other types of receptacles. More particularly, the invention relates to a pipe fitting for receiving an overflow and/or a drain pipe. It will be particularly exemplified as applied to a receptacle of an evaporative cooler.

It is often desirable to connect a pipe to a relatively thin wall of a receptacle to communicate with the internal space thereof. In conventional practice, a pipe fitting is soldered and/or riveted to the wall during the manufacture of the receptacle, the fitting usually providing a threaded portion projecting beyond the wall for threadedly receiving a pipe or a pipe fitting. Tightening of this pipe or pipe fitting often causes loosening of the soldered and/or riveted joint. Even more important, the projecting threaded portion gives trouble in shipping or handling not to mention the fact that the shipping container must be made large enough to accommodate the projection. During shipping or handling, accidental contact with such a projecting threaded portion often causes loosening of the joint, injury to the threads, or bending of the receptacle wall to misalign the projecting threaded portion with respect to the pipe to be connected thereto.

It is an object of the present invention to provide a new and simple pipe fitting which can be manufactured separately from the receptacle and which can be assembled thereto during installing or connecting thereof.

Another object is to provide a sectional fitting of this nature which can be easily assembled without the use of special tools.

Another object is to provide a sectional fitting in which one of the parts, e. g., an internally threaded sleeve member, serves the dual function of aiding the sealing of the pipe fitting to the receptacle wall and receiving the external pipe which is to be attached.

A further object is to provide a pipe fitting which can be assembled with respect to a receptacle wall and which is, by the assembling operation, adequately fastened thereto independently of any separate fastening or connecting means.

It is another object of the invention to provide a pipe fitting having a sealing means which will operate to prevent any leakage thereadjacent. A further object is to employ a sealing means which prevents turning of one of the elements of the pipe fitting during assembly. Still a further object is to provide a sealing means which simultaneously engages two elements of a sectional pipe fitting and which seals at least one of these elements relative to the receptacle wall.

Still another object is to provide a compact pipe fitting composed of easily manufactured parts which can be readily installed and conveniently removed from the receptacle.

Further objects of the invention will be evident from the following specification exemplifying one embodiment.

Referring to the drawing.

In general, our improved pipe fitting comprises a connector fitting adapted to be assembled to a thin-walled receptacle through an outlet opening thereof, and providing a hollow plug member having a head portion disposed within the receptacle and having an externally threaded neck extending through the outlet opening, a deformable sealing means disposed between the plug member and the wall of the receptacle, and an internally threaded sleeve member having an upper portion adapted to engage the receptacle wall and the externally threaded neck and having a lower portion adapted to threadedly receive a drain or supply pipe.

Figure 1:
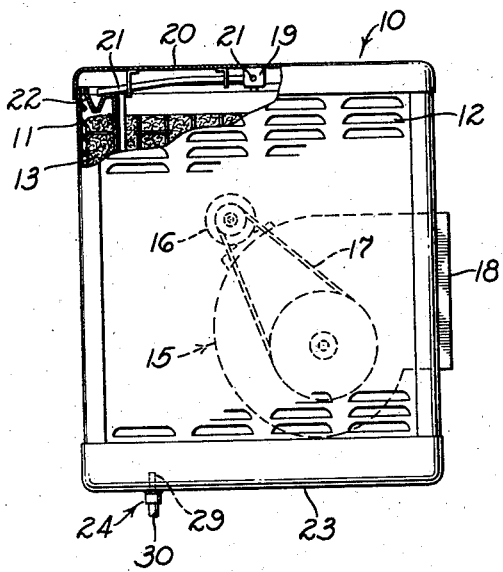
Fig. 1 is a side elevational view, partially broken away, of an air cooler, showing the drain fitting of the invention in assembled position and illustrating a portion of the interior of the air cooler.

For purposes of illustration and without excluding other uses, the invention is shown in Fig. 1 as a drain pipe fitting assembled to an evaporative air cooler having a receptacle 10 formed of sheet metal. Three sides of the receptacle 10 provide louvers or grilles 11 and 12 through which air from the atmosphere enters and passes through a corresponding number of moistened pads 13 which contain a sufficient amount of moisture to cool the air by evaporation of the water. The air is drawn into the receptacle and through the pads 13 by use of a conventional blower unit 15 driven by a motor 16 mounted thereon and connected to the rotor of the blower, not shown, by a belt 17. The rotor forces the cooled air from the receptacle through an outlet 18.

The water used to moisten the pads is admitted into the receptacle through an inlet fitting 19 in top wall 20 of the receptacle. This water is distributed through pipes 21 to troughs 22 from which it drips to the pads to maintain them moist. Any water which is not evaporated drips from the pads and tends to collect in the bottom of the receptacle above a bottom wall 23 thereof. A suitable drain system, incorporating the invention, is used to withdraw any water tending to rise above a predetermined level. This drain system is carried by the pipe fitting of the invention, indicated generally by the numeral 24.

Figure 3:
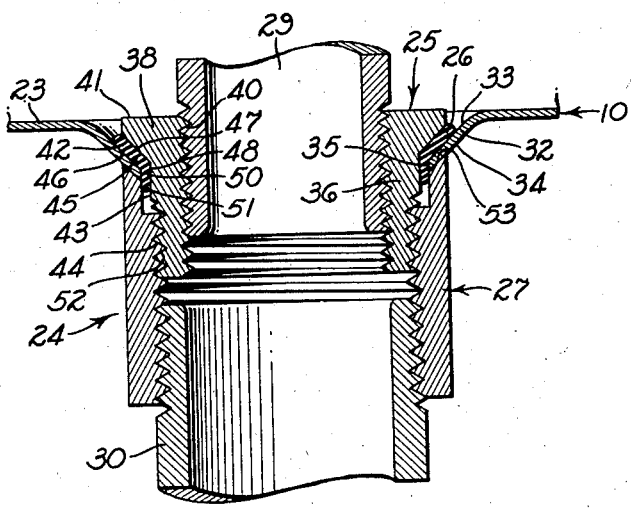
Fig. 3 is a vertical sectional view of the pipe fitting of Fig. 2.

Referring particularly to Fig. 3, the pipe fitting 24 includes, generally speaking, a hollow plug member 25, a resilient or deformable sealing ring 26 and a tubular sleeve member 27. The fitting is shown assembled in connection with the bottom wall 23 to provide a means of attachment for a riser pipe 29 and a drain pipe 30. These pipes form a continuous passageway through the receptacle wall and any water above the upper end of the riser pipe 29 will drop therein to the drain pipe 30.

Figure 2:
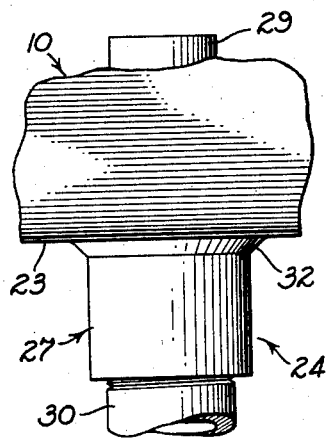
Fig. 2 is an enlarged fragmentary view of the pipe fitting shown in Fig. 1, illustrated as assembled to the wall of the air cooler to carry a riser pipe and a drain pipe.

Referring particularly to Figs. 2 and 3, the lower wall 23 of the receptacle 10 is relatively thin, being typically formed of sheet metal. This lower wall is deformed to provide a substantially conical dished or depressed portion 32 having an inner conical surface 33 and an outer conical surface 34. The depressed portion 32 is provided with a central outlet opening 35 adapted to receive a neck 36 of the hollow plug member 25.

The hollow plug member 25 is preferably constructed of a light metal such as aluminum. It provides a neck 36 depending from a hollow head portion 38, the latter being provided with an internally threaded portion 40 adapted to threadedly receive the riser pipe 29. Preferably the head portion 38 provides a flat top surface 41 which is substantially flush with the inner surface of the receptacle wall 23. In addition, the head portion 38 provides a conical shoulder 42 corresponding in taper with the depressed portion 32. The neck 36 of the plug member 25 has an upper annular portion 43, usually unthreaded, and a lower externally threaded portion 44.

The deformable sealing ring 26 is preferably made of resilient material such as rubber. It may be molded or may be formed of sheet material and deformed into the shape shown when the pipe fitting is assembled. In either instance, the sealing ring, when in sealing position will have a flared portion shown as a conical collar 45 having a conical outer surface 46 substantially conforming in shape to the conical inner surface 33; a conical inner surface 47 substantially conforming in shape to the conical shoulder 42 of the plug member 25; and a cylindrical inner surface 48 within a depending neck 50 adapted to surround and contact the upper annular portion 43 of the plug member 25.

The depending neck 50 serves to space the plug member 25 substantially centrally within the outlet opening 35 of the receptacle wall 23. A portion of the neck 50 preferably extends below the receptacle wall to provide an exposed annular portion 51 engageable with the tubular sleeve member 27, as will hereinafter be described.

The internally threaded sleeve member 27 is preferably constructed of light metal such as aluminum. It provides an upper threaded portion 52 adapted to be screwed onto the externally threaded portion 44 of the neck 36. The sleeve member 27 is counterbored near its upper end to provide an annular lip having a beveled edge 53 to engage the conical outer surface 34 when the sleeve member is tightened. When in this position, this beveled edge 53 also engages the exposed annular portion 51 of the sealing ring 26.

In the preferred method of assembly, the sealing ring 26 is first placed around the upper annular portion 43 of the plug member after which this member is inserted in the outlet opening 35 with the sealing ring 26 between the conical shoulder 42 and the inner conical surface 33. The sleeve member 27 is then threaded on the neck 36 of the plug member until it engages the outer conical surface 34 and the exposed annular portion 51 of the sealing ring 26. The presence of this sealing ring between the head portion 38 of the plug member 25 and the inner conical surface 33 of the depressed portion 32 locks the plug member from turning relative to the receptacle wherefore no special tool is required to prevent turning of the plug member as the sleeve member 27 is tightened. The riser pipe 29 and the drain pipe 30 may be subsequently screwed respectively into the plug member 25 and the sleeve member 27, or these pipes may be threaded into their respective members before the assembly operation.

The sealing ring 26 performs a number of functions. In the first place, it seals against leakage between the plug member 25 and the receptacle. In the second place, it provides a somewhat resilient joint and accommodates itself to any irregularities in the conical surfaces in contact therewith. In the third place, it locks the plug member from turning, as mentioned above. In the fourth place, it engages the sleeve member 27 in sealing relationship. In this connection, if there is any minor leakage between the threads of the riser pipe 29 and the plug member 25, this leakage would tend to follow downward along the exposed threads of the sleeve member and may rise, by capillary action between the external threads of the plug member and the internal threads in the upper threaded portion 52 of the sleeve member 27. Any such leakage enters the counterbored portion of the sleeve member which acts as a chamber. Should this chamber become filled, either because of this leakage or because of leakage between the sealing ring 26 and the plug member 25, there will be no leakage to the exterior of the sleeve member 27 in view of its sealing contact with the exposed annular portion 51 of this ring.

In practice, and to facilitate manufacture, the interior of the sleeve member 27 can be threaded in an automatic screw machine cutting straight threads, as distinct from the conventional tapered pipe threads. The same is true as to the plug member 25. However, in either instance, tapered threads may be employed without departing from the spirit of the invention.

Although we have shown the pipe fitting as embodied in a preferred form of construction, by way of example, it will be understood that it may be modified in various particulars without departing from the spirit of the invention as defined in the appended claims.

We claim as our invention:

1. In combination: a container formed of relatively thin material and having a wall depressed in an annular zone to provide a conical inner surface and a conical outer surface, said conical surfaces extending inwardly toward an opening through said wall; a hollow plug member having a hollow head providing a conical surface substantially conforming in shape to said conical inner surface and having a hollow externally threaded neck extending through said opening; a sealing member providing a conical collar disposed between said head and said conical inner surface and providing a neck depending in said opening around said neck of said plug member; and an internally threaded sleeve screwed on said neck of said plug member and providing a conical upper surface engaging said conical outer surface of said receptacle wall within the periphery of said conical collar of said sealing member to compress said conical collar between said conical inner surface and said head of said plug member.

2. A fitting adapted to be mounted on a receptacle wall having an opening therein, comprising: a hollow plug member having a head adapted to be disposed on one side of the receptacle wall and having a hollow, externally threaded neck of a size to extend through the opening therein; a sealing member having an annular collar which is adapted to surround said neck of said plug member and which is adapted to be positioned between said head and the receptacle wall, said sealing member having an annular neck which is adapted to surround said neck of said plug member and which is adapted to be inserted in said opening in the receptacle wall; and an internally threaded sleeve member adapted to be threaded onto said externally threaded neck of said plug member, said sleeve member having an axially extending, annular portion which is adapted to surround said neck of said sealing member and which is adapted to engage the receptacle wall to compress said annular collar of said sealing member between the receptacle wall and said head of said plug member.

3. A combination as defined in claim 2 wherein said neck of said sealing member surrounds said neck of said plug member and is disposed between said neck of said plug member and said sleeve member.

4. In a fitting adapted to be mounted on a receptacle wall which is provided with an opening therein and which is deformed in an annular zone encircling the opening to provide conical inner and outer surfaces converging to the opening, the combination of: a hollow plug member having a head provided with a conical surface substantially complementary to the conical inner surface of the receptacle wall, and having an externally threaded neck adapted to extend through the opening in the receptacle wall; a sealing member having an annular collar adapted to encircle said neck of said plug member and adapted to be disposed between said conical surface of said head of said plug member and the conical inner surface of the receptacle wall; and an internally threaded sleeve member adapted to be threaded on said neck of said plug member, said sleeve member having a conical end surface which is adapted to engage the conical outer surface of the receptacle wall within the periphery of said annular collar on said sealing member to compress said collar between said head of said plug member and the receptacle wall.

5. In a fitting adapted to be mounted on a receptacle wall which is provided with an opening therein and which is deformed in an annular zone encircling the opening to provide conical inner and outer surfaces converging to the opening, the combination of: a hollow plug member having a head provided with a conical surface substantially complementary to the conical inner surface of the receptacle wall, and having an externally threaded neck adapted to extend through the opening in the receptacle wall; a sealing member having an annular collar adapted to encircle said neck of said plug member and adapted to be disposed between said conical surface of said head of said plug member and the conical inner surface of the receptacle wall, said sealing member having an annular neck adapted to encircle said neck of said plug member and adapted to be inserted through the opening in the receptacle wall; and an internally threaded sleeve member adapted to be threaded on said neck of said plug member, said sleeve member being provided with an axially extending, annular portion adapted to encircle said neck of said plug member and terminating in a conical end surface, said annular portion of said sleeve member and said neck of said plug member being adapted to receive said neck of said sealing member therebetween, and said conical end surface of said annular portion of said sleeve member being adapted to engage the conical outer surface of the receptacle wall within the periphery of said annular collar on said sealing member to compress said collar between said conical surface of said head of said plug member and the conical inner surface of the receptacle wall.

HERBERT S. LEO.
BEN B. BRESLOW.

REFERENCES CITED

The following references are of record in the file of this patent:

UNITED STATES PATENTS

| Number | Name | Date |
|---|---|---|
| 969,358 | Goodall | Sept. 6, 1910 |
| 1,792,345 | Williams | Feb. 10, 1931 |
| 1,981,247 | Pope | Nov. 20, 1934 |